June 23, 1925.

M. SCHWARTZ

BUSHING STRUCTURE

Filed Dec. 10, 1923

1,543,451

Inventor:
Morris Schwartz

Patented June 23, 1925.

1,543,451

UNITED STATES PATENT OFFICE.

MORRIS SCHWARTZ, OF CHICAGO, ILLINOIS, ASSIGNOR OF ONE-HALF TO WINNIFRED B. PARISH, OF CHICAGO, ILLINOIS.

BUSHING STRUCTURE.

Application filed December 10, 1923. Serial No. 679,795.

*To all whom it may concern:*

Be it known that I, MORRIS SCHWARTZ, citizen of the United States, residing at Chicago, in the county of Cook and State of Illinois, have invented a certain new and useful Improvement in Bushing Structures, of which the following is a full, clear, concise, and exact description.

My invention relates to bushings and the assembly thereof with the apertured bodies through which they pass and has for its object the provision of means for rendering fluid tight the union between the bushings and their supporting bodies.

In a prior device, one end of the bushing is curled over the end of a tubular portion provided upon the object receiving the bushing to clamp this tubular portion between the body of the bushing and the annular termination of its curled portion further to render fluid tight the body receiving it, the curled flanges terminated in a thin edge portion which was pressed against the tubular portion. In the device of my present invention the curling of the flange is continued to terminate outside of the circle of the tubular portion to form a smooth surface which is curved along the radii of the bushing to afford a bead which presses against the tubular portion, this bead being free of flaws where it presses against the tubular portion further to insure fluid tight assembly of the bushing and the body receiving it.

Figure 1:
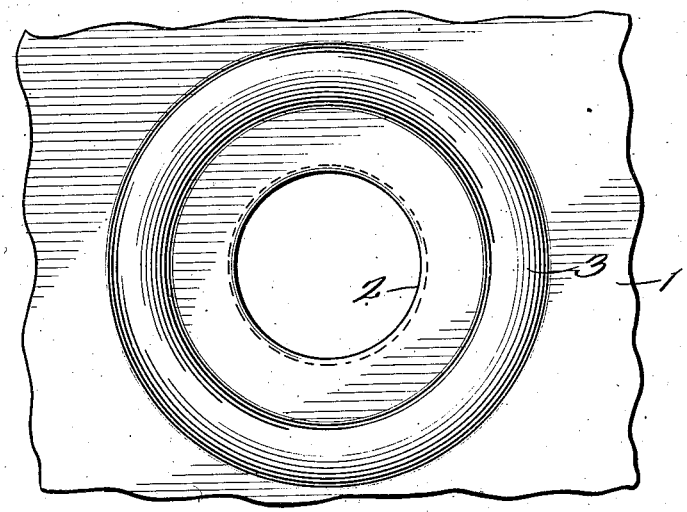
Figure 2:
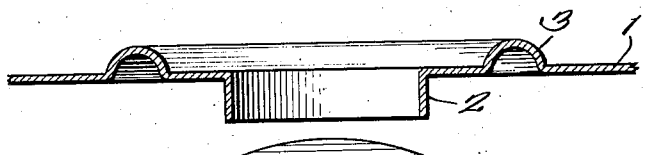
Figure 3:
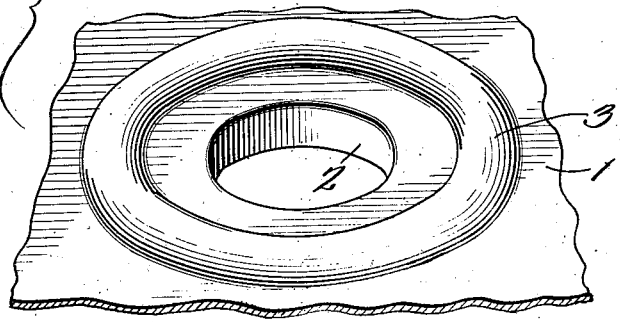
Figure 4:
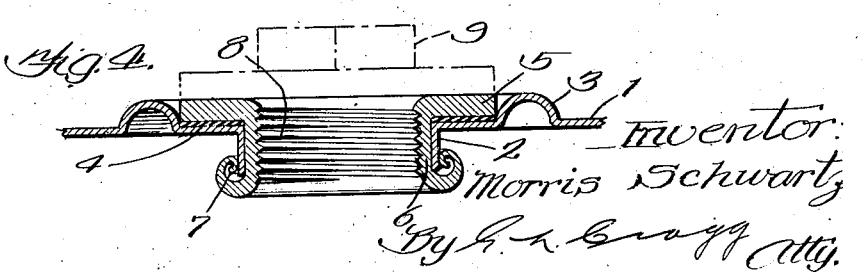

The invention will be more fully understood by reference to the acompanying drawing showing the preferred embodiment of the invention and in which Fig. 1 is a face view of a sheet metal body which is to receive the bushing; Fig. 2 is an axial sectional view of the sheet metal body; Fig. 3 is a perspective view illustrating the bushing and its receiving body in separated relation; and Fig. 4 is an axial sectional view of the assembled bushing and body with the bung shown in dot and dash lines.

Like parts are indicated by similar characters of reference throughout the different figures.

The supporting body 1, a barrel wall for example, is preferably formed of sheet material such as steel. It carries a tubular portion 2 which is preferably integrally formed therewith and projects therethrough. The body 1 is formed with an annular bead or ridge 3 which bulges from the side of the body that is opposite the free or terminating end of the tubular portion. The sealing gasket 4 overlies the annular portion of the body 1 which is surrounded by the bead 3 and is clamped against the same, to be in fluid tight union therewith, by means of the annular flange 5 of the bushing 6. The bushing has one of its ends curled to form the flange 7, this flange enclosing the terminating end of the tubular portion. The curling of flange 7 is continued to terminate outside of the circle of the tubular portion to form a bead which presses, at its mid portion, against the side of tubular portion and firmly presses the tubular portion against the body of the clamp. In the process of assembly sufficient pressure is axially exerted to firmly compress the gasket 4 between the flange 5 and the body 1. Where the bore of the bushing is to constitute a bung hole or other plug receiving opening, the bushing is preferably interiorly threaded to receive the threads exteriorly formed upon the bung 8.

Any suitable formation may be provided upon the bung whereby it may be screwed or unscrewed. In the embodiment of the invention shown the bung is formed with a central square projection 9 which may receive a correspondingly shaped wrench plug.

It is obvious that changes may be made without departing from the spirit of my invention.

Having thus described my invention I claim as new and desire to secure by Letters Patent the following:—

The combination with a body having a tubular portion projecting therefrom and surrounding an opening formed therethrough; of a bushing within the tubular portion and formed with a flange which is curled over the terminating end of the tubular portion against the outer side of the tubular portion, the curling of this flange being continued to terminate outside of the circle of the tubular portion to form a bead which presses, at its mid portion, against the side of the body of the tubular portion.

In witness whereof, I hereunto subscribe my name this 20th day of November A. D., 1923.

MORRIS SCHWARTZ.